United States Patent
Hanlon et al.

(10) Patent No.: US 6,301,007 B1
(45) Date of Patent: Oct. 9, 2001

(54) MACHINE TOOL LOCATOR

(75) Inventors: John A. Hanlon, Los Alamos; Timothy J. Gill, Stanley, both of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/321,910

(22) Filed: May 28, 1999

Related U.S. Application Data

(60) Provisional application No. 60/087,250, filed on May 29, 1998.

(51) Int. Cl.$^7$ ................................................. G01B 11/00
(52) U.S. Cl. ............................................. 356/400; 356/401
(58) Field of Search ................................. 356/400, 399, 356/401, 614, 139.1

(56) References Cited

U.S. PATENT DOCUMENTS

| | | | |
|---|---|---|---|
| 3,736,402 | 5/1973 | Mefferd et al. | 219/121 LA |
| 4,451,892 | 5/1984 | McMurtry | 364/474 |
| 4,653,360 | 3/1987 | Compton | 41/165.71 |
| 4,817,007 | 3/1989 | New | 364/474.01 |
| 4,990,840 | 2/1991 | Migda | 318/571 |
| 5,024,527 | 6/1991 | Harrison | 356/124 |
| 5,054,929 | 10/1991 | Dey | 356/401 |
| 5,069,528 | 12/1991 | Dey | 359/233 |
| 5,072,399 | 12/1991 | Laws et al. | 364/474.29 |
| 5,193,314 | 3/1993 | Wormley et al. | 51/165.71 |
| 5,255,199 | 10/1993 | Barkman et al. | 364/474.17 |
| 5,387,061 | 2/1995 | Barkman et al. | 409/80 |
| 5,461,472 | * 10/1995 | Harvey et al. | 356/138 |
| 5,691,540 | 11/1997 | Halle et al. | 250/372 |

FOREIGN PATENT DOCUMENTS 3238691   4/1984   (DE).

* cited by examiner

*Primary Examiner*—F. L. Evans
*Assistant Examiner*—Zabrew Smith
(74) *Attorney, Agent, or Firm*—Gemma Morrison Bennett

(57) ABSTRACT

Machine tools can be accurately measured and positioned on manufacturing machines within very small tolerances by use of an autocollimator on a 3-axis mount on a manufacturing machine and positioned so as to focus on a reference tooling ball or a machine tool, a digital camera connected to the viewing end of the autocollimator, and a marker and measure generator for receiving digital images from the camera, then displaying or measuring distances between the projection reticle and the reference reticle on the monitoring screen, and relating the distances to the actual position of the autocollimator relative to the reference tooling ball. The images and measurements are used to set the position of the machine tool and to measure the size and shape of the machine tool tip, and examine cutting edge wear.

15 Claims, 3 Drawing Sheets

MACHINE TOOL LOCATOR

This application claims the benefit of U.S. Provisional Application No. 60/087,250 filed May 29, 1998, now copending.

This invention was made with government support under Contract No. W-7405-ENG-36 awarded by the U.S. Department of Energy. The government has certain rights in the invention.

TECHNICAL FIELD

This invention relates to an optical machine tool locator and a method of locating a machine tool.

BACKGROUND ART

It is necessary to know the machine tool tip radius and the position of the machine tool edge relative to the manufacturing machine axis to accurately machine parts within close tolerances. Presently this is generally done using electronic touch probes which locate the tool at the machine in only two dimensions. Touch probe systems cannot provide visual feedback useful for measuring the shape of the cutting tool edge and detecting tool wear and condition. Touch probes are also subject to stiction, dirt and wear.

Visual systems such as optical comparators have been used to measure the shape of the machine tool cutting edge or to detect cutting tool wear. Generally these visual systems are remote from the manufacturing machine and thus are not aligned to reference points that have precise relationships to the machine axes.

Therefore, there is still a need for a measuring and positioning system which can be used at the machine: to set tools accurately without touching the tool or the part; to measure tool radius at the machine; to measure machine tool wear during machining; and to detect and accurately reposition damaged or worn out machine tools.

It is an object of this invention to provide a method and apparatus for measuring and positioning tools for machining.

It is another object of this invention to provide a method and apparatus for measuring machine tool radius and wear.

It is a further object of this invention to provide a machine tool locator which is aligned to a reference point which has a precise, known spatial relationship to the machine axes.

It is yet another object of this invention to provide a method and apparatus for measuring machine tool radius and wear without contact with the machine tool.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims are intended to cover all changes and modifications within the spirit and scope thereof.

DISCLOSURE OF INVENTION

To achieve the foregoing and other objects, and in accordance with the purposes of the present invention, as embodied and broadly described herein, there has been invented an apparatus and method for accurately measuring and positioning machine tools within small tolerances on manufacturing machines such as machine shop lathes.

An autocollimator with projection and reference reticles is positioned so that it is focused through lenses as needed upon a reference tooling ball. The reference tooling ball is located at an exactly known distance from the axis and faceplate of the manufacturing machine.

A digital camera is attached to the viewing end of the autocollimator to receive images reflected back from the reference tooling ball or to view the edges of the machine tool.

A marker and measure generator connected to the digital camera receives digital signals from the camera and can overlay markers, lines and circles on the images before relaying the images to a monitor. Images of the reference reticle, images of the projection reticle reflected from the reference tooling ball, or images of the machine tool tip can be displayed. Fine line crosses generated by the marker and measure generator are overlaid on the monitor screen and positioned over the reference reticles with the measure and marker generator by use of keyboard controls for aligning the tool tip. The marker and measure generator can also be used to measure distances on the monitor screen images, and to measure the size and shape of the machine tool tip.

To align a tool tip, the slides of the three-axis mount holding the autocollimator are moved until the image of the projection reticle that has been reflected from the reference tooling ball is completely aligned on the monitor screen with the image of the reference reticle. The machine tool is then substituted for the reference tooling ball. An image of the reference reticle and the machine tool are displayed on the monitor screen. The machine tool is moved until the image of the machine tool edge is aligned with the reference reticle, meaning that the machine tool edge is also aligned with the known position of the reference tooling ball and therefore with respect to the manufacturing machine axes. At least two viewing directions are provided so the machine tool can be aligned in three dimensions.

To measure the size and shape of the machine tool tip, three or more markers which are generated by the marker and measure generator are aligned with the outer diameter of the image of the machine tool tip displayed on the monitor screen, then a circle which passes through the markers is generated and related to the actual radius of the machine tool tip.

After using these procedures for aligning a machine tool tip and for measuring the shape of a machine tool tip, the actual position and dimensions of the machine tool tip can then be entered into a CNC controller program for generating an extremely accurate tool path that takes into account position and size of the machine tool tip.

By using magnified backlit images of the machine tool tip, the invention also can be used to measure machine tool tip wear.

A PC can be used in place of the marker and measure generator and also can be used to provide a historical record of the machine tool tip wear and the machine tool setting operation.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

Figure 1:
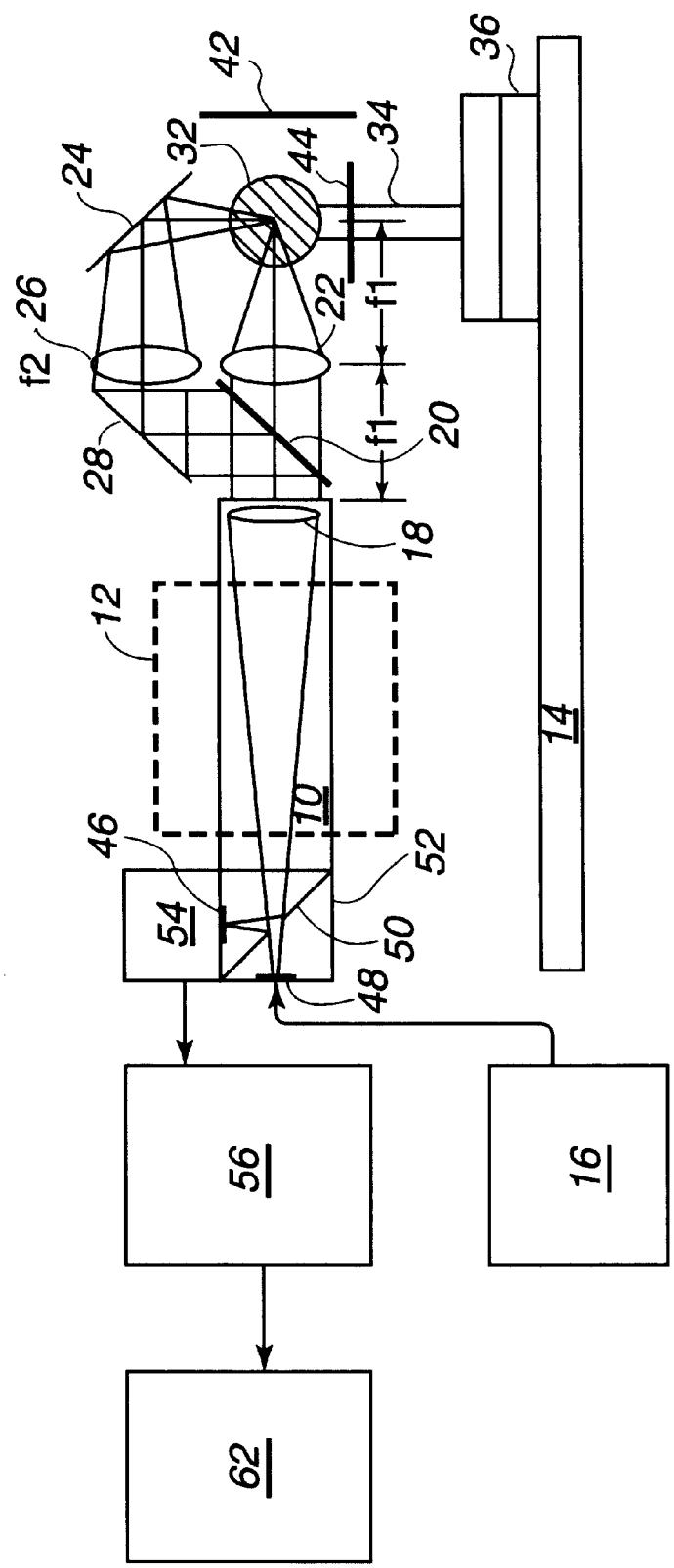
FIG. 1 is a schematic of an embodiment of the invention employing a single autocollimator and a marker and measure generator.

It has been discovered that machine tools can be accurately measured and positioned on manufacturing machines within very small tolerances by use of an autocollimator positioned so as to focus on the center of a reference tooling ball or a machine tool, a digital camera connected to the viewing end of the autocollimator, and a marker and measure generator for receiving digital images from the camera, then displaying or measuring distances between the projection reticle and the reference reticle on the monitoring screen, and relating the distances to the actual position of the autocollimator relative to the reference tooling ball. The images and measurements are used to set the position of the machine tool and to measure the size of the machine tool tip.

The autocollimator having a projection reticle and a reference reticle is mounted upon a three-axis mount that is itself mounted on the manufacturing machine, preferably on a tool setting station. The autocollimator is positioned so as to focus through lenses as needed on the center of a reference tooling ball or the tip of a machine tool placed in the reference tooling ball position.

It is generally presently preferred for the focusing lens to be telecentric, i.e., for the aperture stop to be one focal length behind the lens in object space, so that the image of the tool will not change size as the tool is positioned for alignment.

A telecentric optical layout is needed if comparative measurements are to be made. If the layout is telecentric in object space, the size of the image does not depend on being exactly focused the same way for two different measurement setups; however, if the system is only going to be used for positioning, not comparisons and measurements between different setups, then it is not important to be telecentric in either space. A telecentric optical layout requires a more complex optical configuration in the long optical path.

The reference tooling ball may be mounted on the tool setting station on the manufacturing machine or mounted on a positioning system that moves the reference tooling ball in and out of the alignment position. The reference tooling ball can be secured in any suitable manner in a pre-determined position relative to the axis of the manufacturing machine, preferably on the machine. It is generally presently preferred to secure the reference tooling ball on a kinematic mount, depending upon which type of machine is being used.

Alternatively, the reference tooling ball may be mounted in one of the tool positions on the tool turret of the machine or mounted by any method that places the reference tooling ball at a highly repeatable location relative to the machine axes and in a position that can be viewed by the autocollimator. For machines which do not have a tool setting station, a platform which can serve as a tool setting station and as a place to mount the autocollimator can be attached to the machine by any suitable means.

The reference tooling ball is positioned at an exactly known distance and height from the axis of the spindle of the machine so as to serve as a fiducial point to the spindle centerline. The reference tooling ball is also at an exactly known distance from the machine spindle faceplate. This positioning can be done in any suitable manner known in the art, such as by "tuning the machine."

A commercially available alignment telescope with a projection reticle and reference reticle and which provide magnification and autocollimating capability can be used as an autocollimator in the practice of the invention. One example of a particularly useful commercially available alignment telescope is the Model 4700 alignment telescope from Broomer, because of its small size and convenient mechanical package. Generally presently preferred are instruments which can provide magnification in the range from about 10X to 15X.

Alternatively, if a commercial alignment telescope is not used, an autocollimator capable of serving the same function can be set up using a light source, focusing lenses, and two beam splitters.

Any of a large number of designs for reference tooling balls are useful in the invention. Size of the reference tooling ball is generally not important. Reference tooling balls in the range from about one-half to about five-eighths inch are presently preferred. Suitable reference tooling balls are preferably of high optical quality with high reflectance for visible light.

Generally, commercially available optical reference tooling balls such as the tooling and checking balls from the Ball Division of Industrial Tectronics, Inc., can be used in the practice of the invention and in the invention device.

Any suitable light source can be used to provide light for focusing the autocollimator or alignment telescope. Light sources which are fiber coupled are generally most useful in the invention. Presently preferred are light sources such as the Fostec Model.

To align a machine tool tip, one reticle is projected through the autocollimator toward the center of the reference tooling ball. A beam splitter located in front of the autocollimator splits the light beam into two portions, one of which is allowed to focus through lenses as needed directly upon the portion of the reference tooling ball facing the autocollimator. A second portion of the light beam from the autocollimator is directed by the beam splitter at a 90° angle from the first portion of the beam into reflecting mirrors so that it can be directed upon another surface of the reference tooling ball which is 90° from the reference tooling ball surface contacted by the first portion of the beam. Having the light beam split into two portions and directed at approximately 90° angles onto the reference tooling ball provides for images which allow three-dimensional positioning of the autocollimator relative to the reference tooling ball.

The projected reticle is reflected back into the autocollimator from the reference tooling ball surface.

A second beam splitter located in front of the light source directs a portion of the light reflected from the reference tooling ball, or light from a machine tool put in place of the reference tooling ball, toward the reference reticle. This reflected light and the reference reticle are imaged onto the charge-coupled digital camera.

The autocollimator is mounted on a three-axis mount to enable alignment of the autocollimator on the reference tooling ball by moving the autocollimator until the projected reticle return from the reference tooling ball overlays or is aligned precisely with the reference reticle. The reference reticle is then the indicator of the position of the center of the reference tooling ball. Because the autocollimator is always aligned to the reference point prior to positioning a machine tool, the mechanical system for positioning the device needs to maintain its exact location only during the alignment process. Therefore, long term stability of the mechanical system that serves as the mount and moves the autocollimator is not important.

The autocollimator can be moved by any suitable means known in the art. Generally, depending upon desired size of the mount and resolution of the micrometers, it is presently preferred to move the autocollimator by use of an XYZ optical mount such as those commercially available from many optical mechanical supply sources. An example is the New Focus™ XYZ Model 9064 mount. For remote or automated operation, the mount may need to be motorized and controlled by a PC or other suitable motor controller.

Aligning the autocollimator to the reference point using the invention method is very accurate because the viewing magnification is doubled when the relative motions between the autocollimator and the reference tooling ball are sensed. Magnifications for relative motions of as much as 660 times for the straight-through view and as much as 1100 times for the top view are achievable, depending upon the ratio of the focal length of the lenses at each end of the autocollimator, the magnification of the autocollimator and the electronic magnification from the camera to the video monitor. The magnifications are typically selected in accordance with the typical size of the machine tools to be set and also by the mechanical constraints associated with mounting the autocollimator on the manufacturing machine.

After the autocollimator is aligned upon the reference tooling ball, the reference tooling ball is removed from the viewing position. The machine tool is then moved into the viewing position which was occupied by the reference tooling ball. The autocollimator is held in place as the machine tool is aligned to the autocollimator reference reticle which is the indicator of the reference point. The magnification for viewing the machine tool tip is generally only half as large as the magnification for sensing relative motion between the telescope and the reference tooling ball. The magnification for viewing the machine tool tip can be as much as 330 times for the straight-through view and as much as 550 times for the top view. Again, these magnifications are chosen to be compatible with the range of sizes of the machine tool to be set and the space available to mount the autocollimator.

The machine tool can be moved into position by any suitable means known in the art. Generally it is presently preferred to move the machine tool using toolpath commands stored in a machine CNC (computer numerically controlled) controller.

The machine tool is manually aligned by viewing the tool tip and the reference reticle simultaneously on the video monitor and moving the tool until the images of the edges of the tool tip just touch the reference reticle cross lines. This is done separately for each of the three axes, one at a time, with the result that the tool is accurately positioned in XYZ space relative to the machine axes and faceplate. When the tool is aligned in each axis, the machine slide for that axis is set to zero.

The digital camera images are transmitted to the marker and measure generator in order to add overlays to the images before the images are displayed on the monitor.

The marker and measure generator can be used to calibrate distances on the camera to distances in the actual tool space. The marker and measure generator is calibrated by imaging a calibrated scale onto the camera through the autocollimator, then having the marker and measure generator generate lines which are overlayed on the images of the scale. The coordinates of the lines on the camera are used to relate distances on the camera to the distances in the tool space.

Since the outer edges of the machine tool tip are what will be contacting the workpiece, the radius of the machine tool tip and the exact position of the edges of the machine tool tip are the critical parameters in the tool path program.

After the machine tool is set, the radius of the tool is measured at the machine with the invention device. This is done by using the marker and measure generator to generate coordinates for at least three markers on the edges of the image of the machine tool tip on the monitor screen, then generate a portion of a circle through the markers at the edges of the machine tool tip. The calibration data is used to calculate the machine tool radius using the radius of the best fit of the circle passing through the markers.

Measurements of the size of the machine tool tip and distances of the machine tool tip from the machine axis and spindle faceplate which are generated by the marker and measure generator are then entered into the program for the tool path in the CNC controller which will control the movements of the machine tool during operation of the machine.

Commercially available marker and measure generators are generally useful in the present invention. One presently preferred marker and measure generator is the Model VIA-170 built by Boeckeler and supplied by Bender Associates, Inc., of Tempe, Ariz.

A PC, frame grabber and image processing software can be used in place of the electronic marker and measure generator to generate a reticle of fine lines, to more accurately measure the machine tool shape, and to enhance and automate the alignment process. The PC, frame grabber and image processing software are used to perform all the same functions that the marker and measure generator performs.

If a PC is used, the tool can be positioned semi-automatically by setting an indication of the relative position of the tool edge and the reference point to zero, or automatically by sending the position of the edge of the tool from the PC to a CNC controller to form a closed loop operation.

In addition to performing all the functions of the marker and measure generator, with the frame grabber and appropriate software programming, the PC can enhance images of the machine tool shape without need for backlighting arrangements and can measure and track distances related to the images on the monitoring screen. The location of the outermost edges of the machine tool tip can be found automatically, and the position displayed on the PC monitor and updated as the machine tool is moved. The display can show the distance between the edge of the machine tool tip and the alignment point. This obviates the necessity of the operator having to visually position the tool to touch the appropriate alignment reticle line. Instead, the operator adjusts the position of the machine tool to set the machine tool, for each view and separately for each axis, until the distance between the edge of the machine tool tip and the appropriate cross-hair line which is displayed as a number on the PC monitor is zero. The position of the machine slide is then set to zero.

Using a PC, software can also be programmed to measure more points on the machine tool tip and thus measure the shape of the machine tool edge more accurately than it can be measured by the marker and measure generator. The more complete information about the shape of the machine tool tip can be used in the tool path program. The PC can be programmed to provide accurate offsets for part programs in response to readings of machine tool tip radius.

In addition, the PC or the marker and measure generator can be used to generate a projection reticle that is finer than the autocollimator or telescope reference reticle which can be centered or overlaid on the reference reticle which was established when the reference tooling ball was held in focus. The fine line reticle allows more accurate tool setting.

The PC, frame grabber and software can provide a more clear image of the machine tool tip on the monitor screen without necessity of backlighting of the machine tool tip. This is accomplished by edge sharpening, histogram equalization and frame averaging software image enhancement algorithms.

Because the PC can store the digitized image in memory and then transmit it to a monitor for display on a screen for viewing by an operator, the PC also can be used to provide an historical record of the machine tool tip wear and of the machine tool setting operation which can be used in subsequent operations.

Although any of a large of choice of reticles can be used in the practice of the invention, if a PC and software is used to track the machine tool as it is moved, then the reticle patterns need to be chosen so that the patterns of the reticles do not interfere with the PC algorithms that track the machine tool tip. Presently preferred for a custom design is choice of a single dot for the reference reticle and, for the projection reticle, a cross with a small open space at the center of the cross for positioning over the reference reticle dot during the alignment process.

Frame grabbers which interface with a PC and can be addressed by a useful programming language are suitable for use in the invention. One example of an appropriate frame grabber is the Matrox Pulsar™, commercially available from Matrox of Canada.

Any monitor which allows the operator to see a magnified view of the alignment reticles and images can be used. Monitors with good quality displays and large enough screens to easily view the reticles and machine tool images are preferred. Generally, a monitor with at least a thirteen inch diagonal screen is needed.

The invention methods and apparatuses can be used with manual machining operations. Manual machining operations allow the operator to interact with the machine tool setting steps. Alternatively, use of the invention methods and apparatuses can allow the machining operation to be automated for remote operation of computer controlled automated machining operations in which the tool setting station, the part to be machined, the fixture that holds the part and the machine tool are not touched prior to making a cut.

Once the location of the machine tool edge relative to the machine axis is precisely known, it is accounted for in the CNC tool path program. To cut a precision part to a specified shape, the controller program moves the machine tool the known distance to the machine axis and then along the programmed tool cutting path.

During or after machining, the machine tool can be moved into the viewing position in place of the reference tooling ball to examine the machine tool for wear, dirt or damage. When the reference tooling ball is replaced by the machine tool, magnified backlit images of the tool shape are reflected back through the autocollimator, digitized by the digital camera, and transmitted by the marker and measure generator to the monitor where images of the machine tool tip can be observed. Accommodations for tool wear can then be made when positioning the machine tool and programming the tool path, or the machine tool can be replaced if desired.

Magnified images of the machine tool from more than one direction can be viewed on the monitoring screen. Using the monitor, the tips of machine tools typically magnified as much as 550 or more times can be visually inspected for wear or damage during the tool setting procedure. This gives the operator immediate feedback about the condition of the machine tool tip and confidence in the tool setting procedure.

If a machine tool needs to be replaced, the reference tooling ball is returned to the reference position, the invention device is again aligned to the reference tooling ball and the new machine tool is aligned to the reference position in the same way used to position the original machine tool.

An example of a presently preferred embodiment of the invention is shown in FIG. 1 which is a schematic of a side view of an invention set up. An autocollimator 10 is mounted upon a three-axis mount 12 on a machine tool setting station 14.

A light source 16 provides visible light to the autocollimator 10. Light traveling through the autocollimator 10 is collimated by a lens 18 into a beamsplitter 20. A first portion of the beam is directed straight through a focusing lens 22 toward the center of a reference tooling ball 32 which is held on a vertically positioned rod 34 on a kinematic mount 36.

A second portion of the beam is directed upward into a first reflecting mirror 28, and thence through a focusing lens 26 into a second reflecting mirror 28, and thence toward the center of the upper surface of the reference tooling ball 32 at a right angle to the first portion of the beam.

The beams are reflected back through the autocollimator 10 onto a second beamsplitter 50. The second beamsplitter 50 directs light returned to the autocollimator 10 from the reference tooling ball 32 onto the reference reticle 46 where it is imaged onto the digital charged-couple camera 54.

Digitized images from the autocollimator 10 are transmitted from the charged-couple device digital camera 54 to a marker and measure generator 56 which transmits images to a monitoring screen 62 for viewing by an operator. The images of the reticles 46 and 48 can then be aligned by moving the autocollimator 10. After the autocollimator 10 is positioned and secured in place, then the reference tooling ball 32 is removed and the machine tool tip is moved into the position vacated by the reference tooling ball 32.

Two backlights or light reflecting mirrors 42 and 44 are positioned at a 90° angle to each other and behind the machine tool tip with reference to where the light beam from the autocollimator 10 impinges the machine tool tip. The backlights or light reflecting from mirrors 42 and 44 backlight the machine tool tip so that a high contrast image of the machine tool tip is imaged by the autocollimator 10 onto the reference reticle 46, digitized by the charged-couple digital camera 54, and displayed on the monitoring screen 62.

The machine tool tip is moved until the image of the machine tool tip is aligned with the image of the reference reticle 48 on the monitor screen 62.

After the edges of the machine tool tip are aligned with the image of the reference reticle 48 on the monitor screen 62, the measure and marker generator 56 generates three markers which the operator moves about on the monitor screen 62 until they are positioned exactly on the edges of the images of the machine tool tip.

The measure and marker generator 56 is directed by using key strokes on the marker measure keyboard to generate a portion of a circle through the three markers and calculate the radius of the machine tool tip.

The measurements of the radius of the machine tool tip is displayed on the monitor 62 and then input into a CNC controller tool path program or into whatever program is used to plot the tool path.

Figure 2:
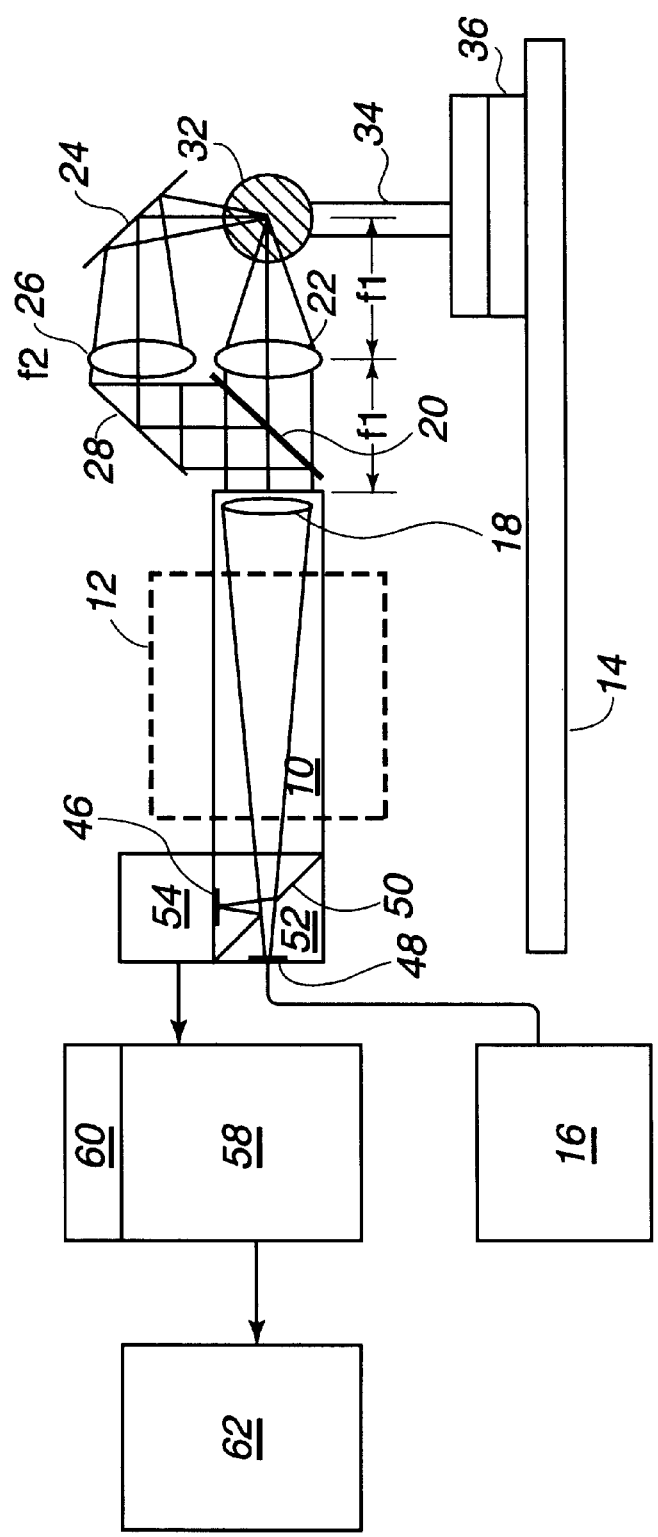
FIG. 2 is a schematic of an embodiment of the invention employing a single autocollimator and a PC.

Alternatively, as shown in the embodiment of the invention shown in FIG. 2, rather than having an operator view the monitoring screen 62 and input values obtained into another program or device, a PC 58 used in place of the marker and measure generator 56 can be programmed to automatically find the complete tool edge and convey the values to an operator or to a CNC controller.

The PC 58 can also be programmed to enhance the images of the machine tool so that backlighting mirrors 42 and 44 can be eliminated, which is a major advantage for some machine setups.

Alternatively, the motions on the XYZ mount 12 and mirror 24 can be motorized so the device can be operated from a remote location. This feature is particularly useful when hazardous materials are being machined.

Figure 3A:
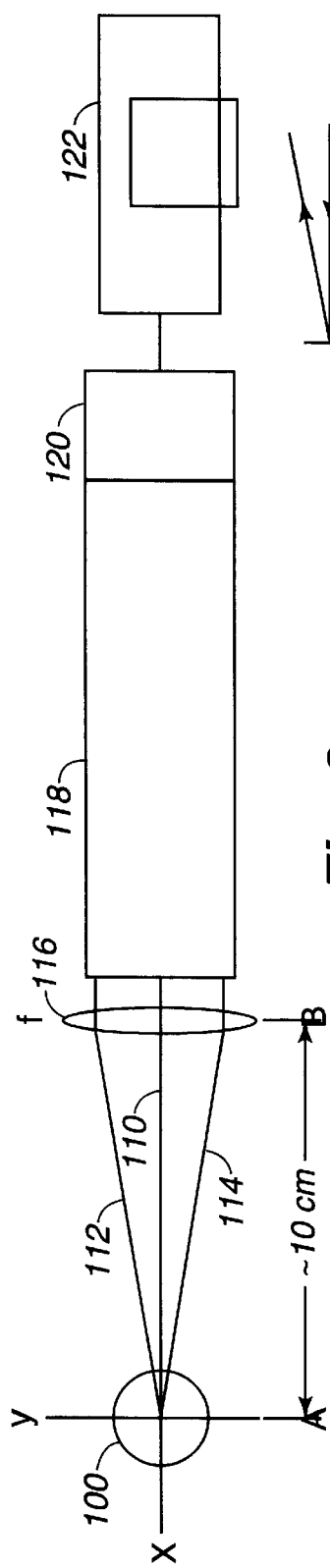
FIGS. 3a and 3b depict autocollimation of light reflected from a reference tooling ball.
Figure 3B:
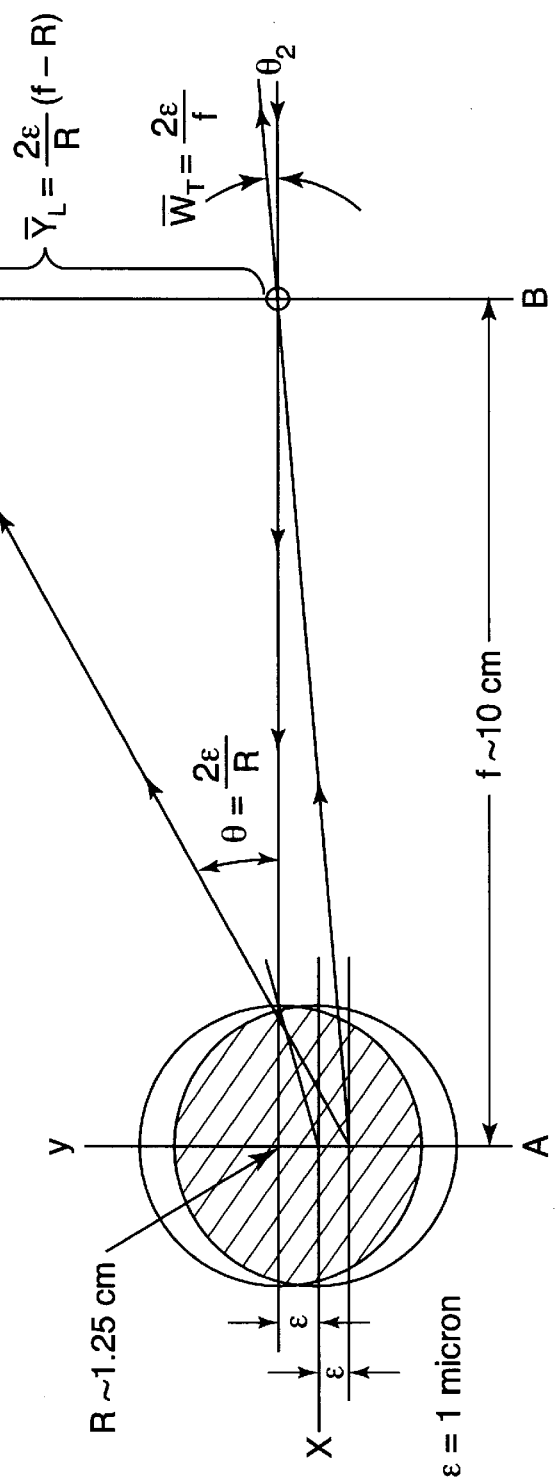

FIGS. 3a and 3b depict how the light reflected from a reference tooling ball is transmitted through an autocollimator suitable for use in the invention. The schematics of FIGS. 3a and 3b are not drawn to scale. In FIG. 3a, a reference tooling ball 100 with a radius R of about 1.25 cm is positioned and centered on axes X and Y. A beam of light 110 from an autocollimator 118 is focused through a lens 116 directly onto the center of the tooling ball 100 using a focal length, shown from A to B, of about 10 cm. A digital camera 120 and computer 122 are connected to received signals from the autocollimator 118. Light is reflected back from the center of the reference tooling ball 100, e.g., rays 112 and 114, through the focal lens 116 and back into the autocollimator 118.

In FIG. 3b, also not to scale, the same reference tooling ball 100 is offset along the Y axis a distance of about 1 micron ($\epsilon$ on the drawing), but is positioned at the same distance of about 10 cm from the center of the reference tooling ball 100 at A to the focal lens 116 at B as shown in FIG. 3a. If the reference tooling ball 100 is displaced along the Y axis, then the single direct beam of light hitting the center of the reference tooling ball 100 will be reflected at a different angle from the center of the reference tooling ball 100. That is, if, for example the reference tooling ball is displaced $\epsilon$ distance, then angle $\theta$ as shown on the drawing will be $$\frac{2\varepsilon}{R},$$

where R is the radius of the reference tooling ball.

As the reflected light enters the collimator 118, the displacement of the tooling ball 100 causes a change in angle $\theta_1$ of reflected light of $$\overline{W}_T = \frac{2\varepsilon}{f}$$

where $\overline{W}_T$=the angle of the center ray returned to the autocollimator, 2$\epsilon$=twice the distance of displacement of the tooling ball; and f=the focal length.

If the whole array of beams of light reflected from the reference tooling ball are considered, then $$\overline{Y}_L = \frac{2\varepsilon}{R}(f - R),$$

where $\overline{Y}_L$=the height of the center ray returned to the autocollimator, 2$\epsilon$=twice the distance of displacement, R=radius of tooling ball, and f=focal length.

In this manner, the reticle of the autocollimator 118 is displaced, the signal to the digital camera 120 is correspondingly changed, and the signal to the computer 122 will result in change of position of the reticle on a monitor display which can be used to reposition the reference tooling ball, or, alternatively, the autocollimator, as needed. Because the invention device is aligned to a reference point that has a precise relationship to the machine axis before machine tools are set, accuracy of the system does not deteriorate as the system ages.

The invention system views tool height as well as tool lateral position, so tools can be aligned in three planes rather than in the two planes normally aligned with conventional systems. Because the machine tool is viewed by the alignment telescope from two orthogonal directions, the machine tool can be accurately located in three dimensional space.

Using the electronic measuring system of this invention method and apparatus, tool wear is observed and tool radius is measured at the machine. Measurement of the tool radius at the machine is important because optical comparators that are typically used to measure machine tool radius are usually not located near the manufacturing machine, so the machine tool has to be removed from the machine to be measured.

The invention device accuracy is at least ten times better than other tool setting systems. Using the invention device, machine tool position can consistently be repeated to within ±0.00001 inch, without touching the part or the machine tool prior to a cut. This degree of accuracy is equivalent to about 0.25 wavelength of green light, or about 1/2000 of the thickness of a dollar bill. The invention method and apparatus can be used to measure machine tool tip radius at the machine with an accuracy of about ±0.00005 inch.

Machine tool inserts are typically not used for precision work because the top of the machine tool is shaped to break off "trailing chips" which makes it difficult to accurately and precisely set the third (tool height) axis for machine tool inserts. However, because the invention method and apparatus enables setting of tool height as easily as it sets the machine tool position in the two horizontal planes, and because condition of the machine tool is easily monitored when using the invention, use of machine tools with inserts rather than precision ground one-piece machine tools is facilitated. Use of inserts in machine tools is preferred because machine tools with inserts are more durable and significantly more economical than precision ground one-piece machine tools.

Because the invention does not rely on an electronic touch probe, machine tools with nonconductive coatings can be set or positioned using the invention method and apparatus.

EXAMPLE I

An algorithm for calculating the sensitivity of the invention apparatus was determined. When the invention apparatus is set up as shown in FIG. 1, if the reference tooling ball is moved by distance $\epsilon_1$, the image of the autocollimated return on the CCD camera moves by $\epsilon_2 = (f_{ccd}$ divided by $f_{ball})$ (M$\alpha$) $2\epsilon_c$, where $f_{ccd}$ is the focal length of the lens on the CCD side and $f_{ball}$ is the focal length of the lens on the ball side; M$\alpha$ is the angular magnification of the autocollimator. The quantity $2(f_{ccd}$ divided by $f_{ball})$ (M$\alpha$) is the effective magnification and will typically be in the range from about 5 to about 20, depending upon design choices. If a nominal value for the overall magnification of 10 is taken, a 40 microinch error in ball positioning causes a 400 microinch displacement on the CCD. With electronic magnification (CCD to display monitor, which is typically 20 to 50) several microns of ball displacement can easily be seen on a 10 inch diagonal TV monitor. The magnification for positioning a cutting tool is only half as big. This calculation indicates that a placement accuracy of ±0.0001 inch is possible. Tool settings as accurate as ±0.000010 were achieved.

EXAMPLE II

For a laboratory measurement of the sensitivity of the invention apparatus, equipment was set up essentially in the manner shown in FIG. 1. The sensitivity for positioning a reference tooling ball on the straight through axis was tested by changing the relative position of the alignment telescope and the tooling ball with micrometers. A 10-inch monitor was used.

For the straight through path, i.e., the axis used to set tool height, and using a 60 mm lens, the autocollimated return moved 5 divisions when the micrometer was adjusted by 0.0035 inches. The sensitivity for this axis is therefore 0.0007 inches/division. With this sensitivity, it is quite easy to repeat alignment settings on the tooling ball to ±0.000010 inches.

This magnification seemed to be about the right trade off between field of view and mechanical adjustment, although a little more magnification would be preferred if there were room enough between the optical locator device and the machine tool.

EXAMPLE III

The sensitivity for positioning a reference tooling ball on the long axis was tested by changing the relative position of the alignment telescope and the tooling ball with micrometers. A 120 mm lens was put into a translation mount that was used for alignment. The translation mount was put in the long leg of the upper path to keep the head compact for the best mechanical stability.

The sensitivity measured for this axis was 0.0053 inches/5 divisions or 0.001 inch/division. The ratio of the magnifications (10/7) was not quite the same as the ratio of the lens focal length (10/6). This was most likely because the alignment telescope focus was not exactly set for infinity, but rather adjusted to get both axes into the best focus as the same time. Even though the sensitivity for this axis was less than that for the straight through axis in Example II, it was possible to repeat alignments to the tooling ball to ±0.000020 inches.

EXAMPLE IV

The sensitivity which can be achieved for tool positioning was tested using the same equipment set up as used in Examples II and III. Tool height was set using a 60 mm axis. For positioning the tool the sensitivity on this axis was 0.007 inches/5 divisions or 0.0014 inches/division. With this magnification, tool positions can be reset to within about ±0.000025 inches. Sensitivity could be changed by changing the lens focal length.

EXAMPLE V

Another test of the sensitivity of tool positioning was made using essentially the same equipment set up, except that a 120 mm focal length lens was used for setting tool position.

For this axis the sensitivity for setting the tool was 0.0021 inches/division, which, as resulted in Example IV, was two times less than the sensitivity for aligning the tooling ball on this same axis. A setting on this axis could be repeated to about ±0.000050 inch.

While the apparatuses and methods of this invention have been described in detail for the purpose of illustration, the inventive apparatuses, articles of manufacture, method and compositions are not to be construed as limited thereby. The claims of this patent are intended to cover all changes and modifications within the spirit and scope thereof

INDUSTRIAL APPLICABILITY

The invention device can be used as a precision non-contact tool locator for lathes, milling machines, drilling machines and electrodischarge machines; as an inspection machine to inspect tools or small machine parts; to measure part geometry to within ±0.00005 inch; to identify and compensate for discrepancies in tool size, wear and position during machining; and for improving accuracy of machining operations.

What is claimed is:

1. An apparatus comprising:
   (a) an autocollimator having a projection reticle and a reference reticle;
   (b) said autocollimator moveably mounted upon a machine tool setting station and positioned so as to focus upon a reference tooling ball or machine tool;
   (c) a digital camera attached to viewing end of said autocollimator and connected to a marker and measure generator;
   (e) said marker and measure generator connected to a monitor with screen;
   (f) wherein a first beam splitter is positioned so as to split a beam of light from said autocollimator, direct one portion of said beam onto said tooling ball in line with said autocollimator and to direct at least one other portion of said beam into reflecting mirrors positioned to direct said beam onto said reference tooling ball at a position 90° from where said first portion of said beam contacts said reference tooling ball.

2. An apparatus as recited in claim 1 wherein a second beam splitter is positioned so as to split a beam of light reflected from said reference tooling ball toward the reference reticle of the autocollimator.

3. An apparatus as recited in claim 1 wherein said manufacturing machine has a CNC controller.

4. An apparatus as recited in claim 1 wherein a PC with a frame grabber is substituted for said marker and measure generator.

5. An apparatus as recited in claim 1 wherein said reference reticle is a single dot and said projection reticle is a cross with an open space at the center of the cross.

6. An apparatus as recited in claim 1 further having a second autocollimator positioned to focus onto said reference tooling ball 90° from where said first autocollimator focuses onto said reference tooling ball.

7. A method for accurately positioning a machine tool on a manufacturing machine comprising:
   (a) focusing light from an autocollimator on a reference tooling ball positioned at an exactly known distance and height from the axis of said manufacturing machine;
   (b) aligning an image of a projection reticle of light reflected from said reference tooling ball with an image of a reference reticle on a monitor screen by moving said autocollimator;
   (c) substituting said machine tool for said reference tooling ball;
   (d) aligning an image of a projection reticle of light reflected from said machine tool with said image of said reference reticle on said monitor by moving said machine tool; thereby
      positioning said machine tool at an exactly known distance and height from an axis of said manufacturing machine; and
   (e) entering said radius of the tip of said machine tool into a CNC controller program.

8. A method as recited in claim 7 further comprising
   (a) collimating said light reflected from said reference tooling ball;
   (b) directing collimated light into a digital camera; and
   (c) transmitting digitized signals from said digital camera to a measure and marker generator.

9. A method as recited in claim 7 further comprising
   (a) generating a reference reticle and a projection reticle corresponding to said reflected light from said machine tool with said measure and marker generator; and
   (b) transmitting said generated reference reticle and projection reticle from said measure and marker generator to said monitoring screen.

10. A method as recited in claim 7 further comprising focusing light from said autocollimator onto said reference tooling ball from at least two different directions so that at least two different projection reticles are created.

11. A method as recited in claim 10 wherein said light from said autocollimator is focused onto said reference tooling ball from at least two different directions by using a beam splitter and at least one reflecting mirror.

12. A method as recited in claim 10 wherein said light is focused onto said reference tooling ball from at least two different directions by using a second autocollimator.

13. A method for measuring the shape of a machine tool tip on a manufacturing machine comprising:
   (a) focusing light from an autocollimator onto said machine tool tip;
   (b) focusing an image of said machine tool tip with light reflected from said machine tool tip on a monitor;
   (c) generating three or more markers with a marker and measure generator;
   (d) aligning said three or more markers with the outer diameter of said image of said machine tool tip displayed on said monitor screen;
   (e) generating a circle which passes through said three or more markers on said monitor screen; and
   (f) correlating size of said circle to actual radius of said machine tool tip; and
   (g) entering said radius of said machine tool into a CNC controller program.

14. A method for examining wear of a machine tool tip on a manufacturing machine comprising:
   (a) sending magnified backlit images of a machine tool tip through an autocollimator to a digital camera;
   (b) transmitting digitized images of said machine tool tip from said digital camera to a monitor screen where said images can be viewed;
   (c) transmitting digitized images of said machine tool tip from said digital camera to a measure and marker generator where measurements and markers can be generated prior to transmitting said digitized images to said monitor screen; and
   (d) transmitting said measurements and markers to said monitor screen where said measurements and markers can be viewed.

15. A method as recited in claim 14 further comprising using a PC to measure distances related to said images on said monitoring screen.

* * * * *